United States Patent

Ho

[15] 3,676,863

[45] July 11, 1972

[54] MONOLITHIC BIPOLAR DYNAMIC SHIFT REGISTER

[72] Inventor: Irving T. Ho, Poughkeepsie, N.Y.

[73] Assignee: International Business Machines Corporation, Armonk, N.Y.

[22] Filed: March 11, 1970

[21] Appl. No.: 18,583

[52] U.S. Cl. ......................340/173 CA, 307/221, 307/238, 340/173 R

[51] Int. Cl. ..................................G11c 11/24, G11c 19/00

[58] Field of Search ..................340/173 CA, 173 FF, 173 R; 320/1; 307/221, 238, 279

[56] References Cited

UNITED STATES PATENTS

| | | | |
|---|---|---|---|
| 3,289,010 | 11/1966 | Bacon | 307/221 |
| 3,461,312 | 8/1969 | Farber | 307/238 X |
| 2,906,890 | 9/1959 | Odell | 307/221 |
| 3,546,490 | 12/1970 | Sangster | 320/1 X |

FOREIGN PATENTS OR APPLICATIONS

| | | | |
|---|---|---|---|
| 1,922,761 | 2/1970 | Germany | 340/173 CA |
| 953,517 | 3/1964 | Great Britain | |

*Primary Examiner*—Howard W. Britton
*Assistant Examiner*—Stuart Hecker
*Attorney*—Hanifin and Jancin and Kenneth R. Stevens

[57] ABSTRACT

A monolithic memory including a plurality of interconnected cells. Each cell includes a diode in series with bipolar device or transistor which is dynamically or pulse powered. Parasitic capacitors are used as storage elements.

9 Claims, 4 Drawing Figures

INVENTOR
IRVING T. HO

BY Kenneth R. Stevens
ATTORNEY

MONOLITHIC BIPOLAR DYNAMIC SHIFT REGISTER

BACKGROUND OF THE INVENTION

1. Field of the Invention

This invention relates to memories and more particular to monolithic memories using bipolar devices.

2. Brief Description of the Prior Art

Extremely high speed random access main memories are contemplated which would employ monolithic cross-coupled type transistor devices. However, this memory is not suitable for all applications due to its high cost. One known figure of merit for a monolithic memory is the Power·Time·Area product, P·T·A. The P variable is roughly established by $V_2$ Cf, where V is the voltage applied to the cells, C is the capacitive value of the storage element, and f is the applied clock frequency used to charge the cells. The T variable in the figure of merit formula refers to the access time for the memory. Finally, the A parameter takes into consideration the silicon area required for each cell on the monolithic chip. The figure of merit for recently developed field effect transistor (FET) monolithic memories is extremely good.

However, for some system functions, it has been concluded that improved figures of merits are obtainable vis-a-vis those for FET monolithic by employing a bipolar dynamically powered memory cell. In using a bipolar cell, some concession is conceded as to the A parameter, but even this has been limited by virtue of recently developed self-isolation processing techniques.

The overall figure of merit for a bipolar cell is considerably enhanced in the present invention by improving the P variable. This is accomplished by the minimized V and C factors. Also, a 10 megacycle clock or charging rates is compatible with the bipolar memory of the present invention, and thus the f factor is in a desirable range.

Some prior art monolithic memories use complex X-Y decoding schemes which create metallization and interconnection problems when fabricating the structure in monolithic form. However, applying the principles of the present invention in conjunction with a dynamic shift register gives rise to simplified decoding structure. The present invention further lends itself to the fabrication of devices having increased density per unit area which allows for decreased costs and operation at reduced power consumption.

SUMMARY OF THE INVENTION

It is an object of the present invention to provide a monolithic memory which can be fabricated at higher device per unit area densities with attendant reduced power requirements.

It is another object of the present invention to provide a monolithic memory which possesses simplified decoding means.

Another object of the present invention is to provide a monolithic memory which may be operationally accessed at high speeds, but yet is economically capable of being fabricated in monolithic form.

In accordance with the aforementioned objects, the present invention provides a monolithic memory including a plurality of interconnected cells. Each cell includes a diode in series with a bipolar or transistor device which is dynamically or pulse powered. Parasitic capacitors are employed as storage elements.

The foregoing and other objects, features and advantages of the invention will be apparent from the following, more particular description of the embodiments of the invention, as illustrated in the accompanying drawings:

BRIEF DESCRIPTION OF THE PREFERRED EMBODIMENTS

Figure 1:
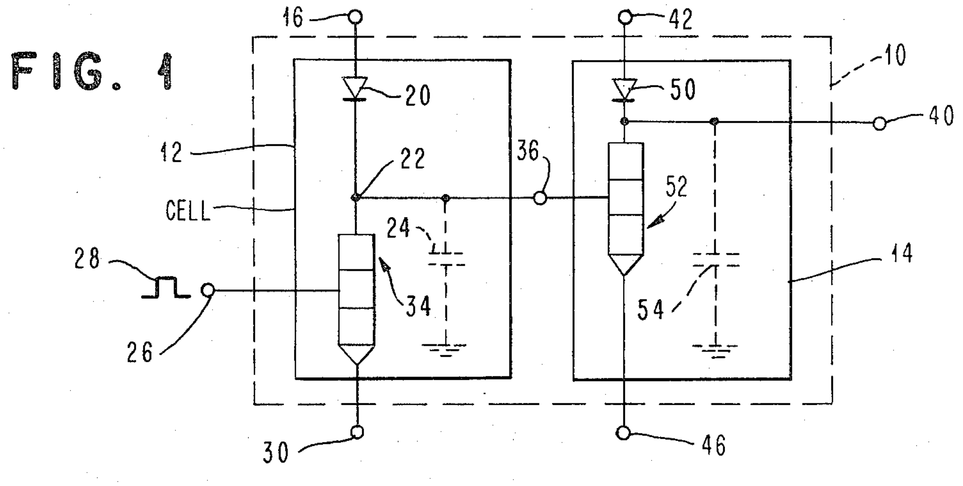
FIG. 1 is a schematic diagram illustrating one stage of the monolithic memory including a pair of cells.

FIG. 1 illustrates one stage of the monolithic dynamic or pulse powered bipolar shift register. A single stage 10 includes a first cell 12 and a second interconnected cell 14. The cell 12 comprises a regeneration terminal 16 adapted to receive a regeneration pulse signals 18, illustrated in FIG. 1A. The regeneration signals are applied to a charging path which includes diode 20, node 22, and parasitic capacitor 24 connected to ground which may be the substrate of an integrated circuit chip. A data input terminal 26 is adapted to receive bilevel data information, illustrated in its up state at 28, and gating terminal 30 is adapted to receive gating pulse signal 32. Connected to the terminals 26, 30, and to the node 22 is a bipolar semiconductor device or transistor 34. An output terminal 36 is connected to the node 22 and the capacitor 24 and is adapted to receive output data information, in accordance with the data input signal at terminal 26. In the monolithic memory of the present invention, parasitic capacitor 24 comprises the PN junction capacitor between collector of the NPN device 34 and its substrate.

Similarly, the second cell 14 includes like elements. The output terminal 36 is now the input terminal to cell 14. A terminal 40 is the output terminal for the second cell as well as the output terminal for the stage 10 itself. The second cell likewise includes a regeneration terminal 42 adapted to receive regeneration pulse signals 44 and a gating terminal 46 which is adapted to receive gating pulses 48, FIG. 1A. The second cell also includes a diode 50, a NPN transistor 52, and a parasitic capacitance 54 connected to the terminal 40. The diodes 20 and 50 may be fabricated in monolithic form as PN junction diodes or Schottky Barrier diodes.

Figure 2:
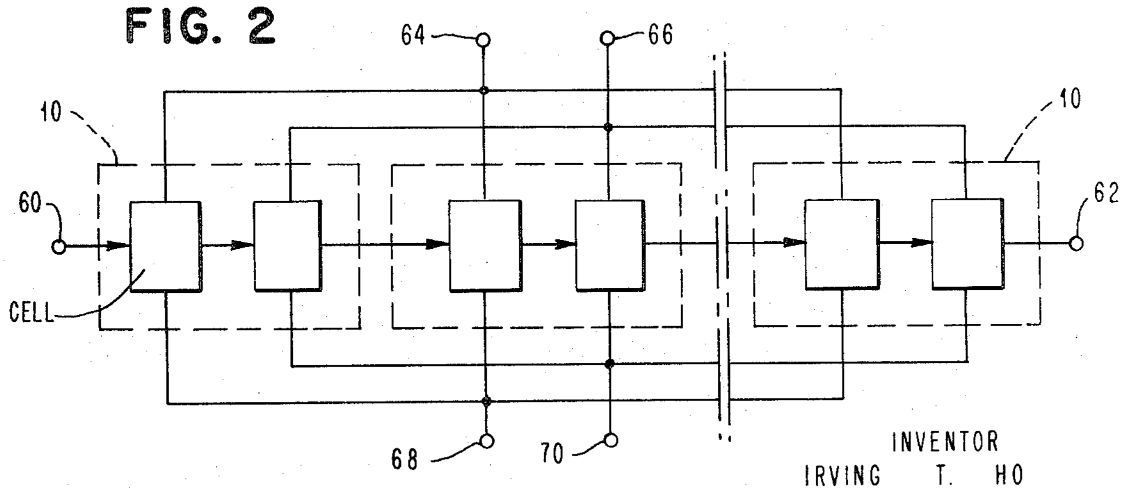
FIG. 2 is a block diagram of a bipolar dynamic shift register formed by interconnecting a plurality of stages, each stage including a pair of cells, as previously described with respect to FIG. 1.

A plurality of stages 10 are interconnected to form a multistage dynamic shift register, as illustrated in FIG. 2. Data input information is received at input terminal 60 and dynamically transferred from stage to stage until it reaches output terminal 62. It is possible to interconnect the individual stages 10 via output terminal 62 into numerous configurations in accordance with the memory function desired, e.g., a line (not shown) can interconnect terminal 62 to terminal 60 through some conventional logic control circuitry. Regeneration pulse signals are applied to the first cell of each of the individual stages 10 via input terminal 64, as previously described with respect to the regeneration signals 18. Terminal 66 is adapted to receive regeneration signals for application to the second cell of each of the stages 10 and would correspond to signal 44. Also, terminals 68 and 70 receive gating signals which would correspond to gating signals 32 and 48.

Signals 18 and 32 could be supplied from a single source. This would limit the down level of V and the up level of $V_{REF}$ to being one in the same. For example, terminals 16 and 30 could be connected to a two phase square wave source. This has the advantage of simplifying the conversion of the cell of FIG. 1 to monolithic form, separate metallized conductors are eliminated for terminals 16 and 30, but restricts the selection of a $V_{REF}$ value. Of course, if signals 18 and 32 are separate but overlap, then a greater likelihood of a leakage path through the associated transistor exists, but timing problems of generating pulses 18 and 32, 44 and 48 are not as critical. The leakage path causes the cell to consume more power.

OPERATION

Initially at time $t_o$, the first cell of each stage receives a regeneration pulse or signal 18 at its terminal 16. Each transistor in the cell is off and thus the regeneration pulse 18 is effective to charge the capacitor 24. At time $t_1$, terminal 26 is energized simultaneously by a data signal 28 represented as being in an up state. Accordingly, transistor 34 is turned on and capacitor 24 is discharged therethrough and goes to a down state. Therefore, information received at transistor 34 is transferred to output terminal in inverted form.

Next, at time $t_3$ terminal 42 receives a regeneration pulse signal 44 which charges capacitor 54. Irrespective of the level or state of the signal at the base of transistor 52, the gating signal at terminal 46 is up or at a $V_{REF}$ condition and thus transistor 52 is off. Thereafter, at $t_4$, a gating signal 48 is applied to the terminal 46. If an up state exists at terminal 36, then capacitor 54 discharges through transistor 52. However, as in the present illustration, terminal 36 is at a down potential (signal 28 inverted), and thus capacitor 54 does not discharge because transistor 52 does not conduct. Accordingly, the output terminal 40 is in an up state.

Figure 1A:
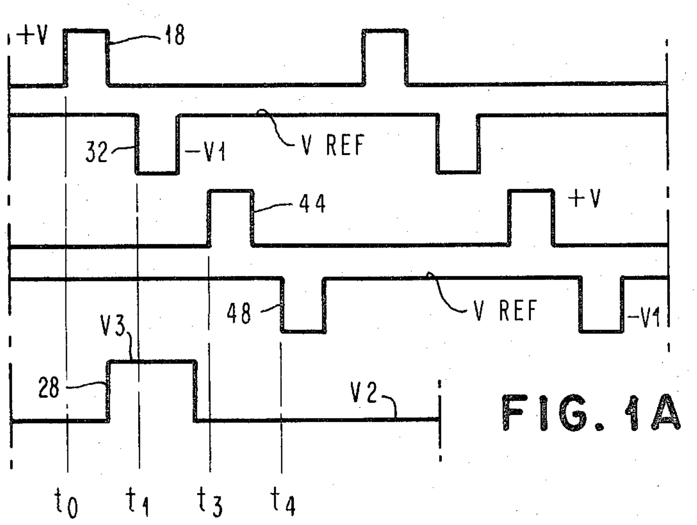
FIG. 1A illustrates pulses which are used to power the cells of FIG. 1.

As shown by FIG. 1A, the regeneration pulses 18 and 44 extend from a down level to a +V value. Similarly, the gating signals 32 and 48 extend from a $V_{REF}$ level to a $-V1$ level. The data signal 28 is illustrated as extending from a down level of V2 to an up level of V3. Specific voltage values may be conveniently selected as long as the following constraints are followed:

$$+V-V_{REF} < 2V_{BE}$$

$$V3-V_{REF} < 1V_{BE}$$

$$V2-(-V1) < 1V_{BE},$$

where $V_{BE}$ represents a single base to emitter voltage drop which is approximately 700 mv in bipolar silicon technology.

The first relationship must be maintained in order to insure that the second cell transistor 52 does not turn on when capacitor 24 is charged at the positive level. Similarly, the second and third relationships must be maintained in order to insure that the transistor 34 does not conduct and allow capacitor 24 to discharge therethrough unless the data signal 28 is high during the gating period.

The $V_{REF}$ voltage may be arbitrarily selected as zero volts, however, in some cases advantages are obtained by maintaining this voltage value at a positive level. With terminals 30 and 46 maintained at a positive value above ground, there is less likelihood of either transistor 34 or 52 conducting, and thus a potential leakage path is more effectively blocked.

Figure 1B:
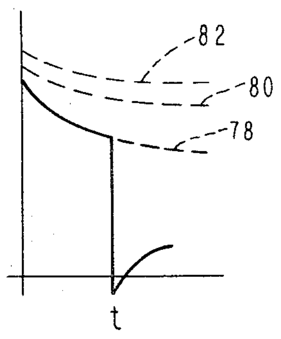
FIG. 1B is a plot of voltage versus time and illustrates the voltage condition across the parasitic capacitors in the cells of FIG. 1 for both levels of input signal being applied to the cell.

In FIG. 1B, the solid curve represents the voltage condition across a parasitic capacitor as it is first charged by a regeneration pulse and then discharged upon conduction of its associated transistor. This voltage characteristic exists when the input signal is in an up state. On the other hand, if the applied data information is in a down state, its associated transistor remains non-conductive and the voltage across the capacitor will decay slowly as shown by the dotted line 78. Dotted lines 80 and 82 also illustrate the voltage condition across a parasitic capacitor when the data information is at a down level, i.e., its associated transistor does not provide a discharge path. The different rates of decay for curves 80 and 82 depict the resulting voltage condition across the capacitor when a more positive $V_{REF}$ is employed. A more positive $V_{REF}$ or gating signal is associated with the curve 82 than for the curve 80. The cell transistor in this example is more effectively blocked when the transistor emitter is biased more positively and thus less leakage exists through the base-emitter diode of the transistor.

It is appreciated that if PNP transistors were used, the relative values and polarities of voltages depicted in the operation of the cells would be reversed.

While the invention has been particularly shown and described with reference to the preferred embodiments thereof, it will be understood by those skilled in the art that the foregoing and other changes in form and detail may be made therein without departing from the spirit and scope thereof.

What is claimed is:

1. A monolithic dynamic bipolar shift register comprising:

a. a plurality of interconnected stages;

b. each stage including a first and a second interconnected cell, comprising:

1. an input terminal and an output terminal, said input terminal being adapted to receive pulse input data signals and said output terminal being adapted to deliver output data signals,
2. a transient charging path including a capacitor, depositing
3. said charging path being adapted to cyclically receive pulse generation signals from an external source for depositing a predetermined amount of charge on said capacitor,
4. a bipolar semiconductor device connected to said input terminal and to said charging path, said bipolar device being of same conductivity type for said first and second cells,
5. said bipolar semiconductor device including a plurality of terminals,
6. at least one of a plurality of said terminals being adapted to receive the input data signals, said bipolar semiconductor device being responsive to the data signals to selectively assume a first or a second conductivity state for providing a transient conductive discharge path in order to deliver output data signals to said output terminal.

2. A monolithic dynamic bipolar shift register as in claim 1 wherein:

a. said bipolar device is switched to a conductive state in response to the data signals to provide a transient conductive path for selectively discharging said capacitor therethrough.

3. A monolithic dynamic bipolar shift register as in claim 1 wherein:

a. said output terminal of said first cell is connected to the input terminal of said second cell, b. another of said plurality of terminals being adapted to receive gating signals, c. said bipolar semiconductor device being responsive to the gating signals and the data signals to selectively assume a first or a second conductivity state in order to transfer output data signals from said first cell to said second cell.

4. A monolithic dynamic bipolar shift register as in claim 3 wherein: p1 a. said output terminal of said second cell provides input data signals to a next succeeding stage.

5. A monolithic dynamic bipolar shift register as in claim 4 wherein:

a. said generation signals, data signals, and gating signals occur periodically.

6. A monolithic dynamic bipolar shift register as in claim 5 wherein:

a. said data, generation and gating signals each have at least two distinct states.

7. A monolithic dynamic bipolar shift register as in claim 6 wherein:

a. said capacitor comprises a parasitic capacitor associated with said bipolar semiconductor device.

8. A monolithic dynamic bipolar shift register as in claim 7 further comprising:

a. a monolithic substrate, b. said bipolar semiconductor device comprising a transistor, c. said parasitic capacitor being constituted by the collector to monolithic substrate parasitic capacitance, and d. said input and output terminals being constituted by the base terminal and collector terminals, respectively, of said transistor.

9. A monolithic dynamic bipolar shift register as in claim 8 wherein:

a. said another terminal comprises an emitter terminal.

* * * * *

PO-1050 (5/69)

UNITED STATES PATENT OFFICE
CERTIFICATE OF CORRECTION

Patent No. 3,676,863 Dated July 11, 1972

Inventor(s) Irving T. Ho

It is certified that error appears in the above-identified patent and that said Letters Patent are hereby corrected as shown below:

Column 4, line 12 (In the Claims, Claim 16, line 12) delete "depositing".

Column 4, line 47 (In the Claims, Claim 19, line 3) delete "pl" and make paragraph after "wherein:"

Signed and sealed this 9th day of January 1973.

(SEAL)
Attest:

EDWARD M. FLETCHER, JR.
Attesting Officer

ROBERT GOTTSCHALK
Commissioner of Patents